United States Patent [19]

White

[11] Patent Number: 4,608,283
[45] Date of Patent: Aug. 26, 1986

[54] BAG WITH BOW

[76] Inventor: Ruth A. White, 550 Horton Ave., Tipp City, Ohio 45371

[21] Appl. No.: 772,810

[22] Filed: Sep. 5, 1985

[51] Int. Cl.⁴ .............................................. D04D 7/10
[52] U.S. Cl. ......................................... 428/4; 24/266; 156/70; 428/101
[58] Field of Search ................ 428/4, 5, 101; 156/70; 24/266

[56] References Cited

U.S. PATENT DOCUMENTS

| | | | |
|---|---|---|---|
| 2,841,905 | 7/1958 | Wanchek | 428/5 |
| 3,301,387 | 1/1967 | Erickson | 428/5 X |
| 3,632,464 | 1/1972 | Griskis | 428/4 |
| 3,637,455 | 1/1972 | Pearson et al. | 428/4 |
| 3,913,648 | 10/1975 | Sessler | 150/52 G X |
| 4,112,551 | 9/1978 | Sales | 24/117 R |
| 4,270,247 | 6/1981 | Freedom | 24/30.5 R |
| 4,276,031 | 6/1981 | Lueck | 434/260 |
| 4,329,382 | 5/1982 | Truskolaski et al. | 428/4 |
| 4,476,168 | 10/1984 | Aoyama | 428/4 |
| 4,515,837 | 5/1985 | Cheng | 428/4 |

*Primary Examiner*—Henry F. Epstein
*Attorney, Agent, or Firm*—Biebel, French & Nauman

[57] ABSTRACT

A gift package includes a self-forming bow, in which the operating ribbons are elongated and formed as an integral part of a gift presentation or gift-receiving bag, with the operating ribbons generally encircling the bag at the open top thereof, whereby pulling the bow-forming ribbons closes the bag top in the nature of a drawstring and, at the same time, forms a decorative bow at one side of the gathered top, complete for presentation. The package is reusable by extracting the bow to its original position. Prior to operating, the bow-forming ribbon lies flat against the side of the ungathered bag to make a compact arrangement for shipping, storing or display.

3 Claims, 8 Drawing Figures

U.S. Patent  Aug. 26, 1986  Sheet 2 of 2  4,608,283
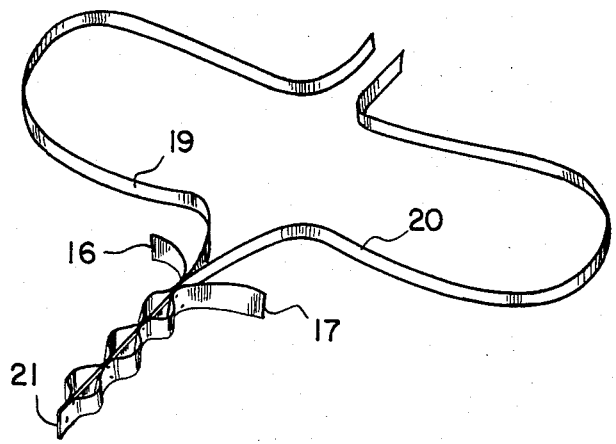
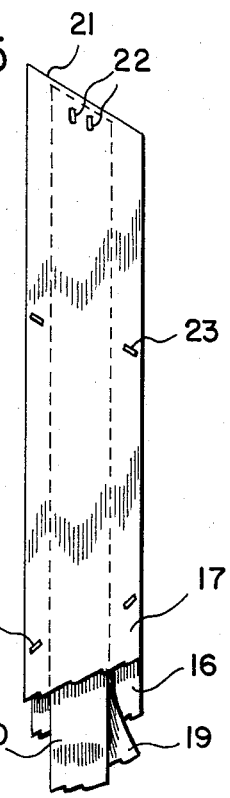
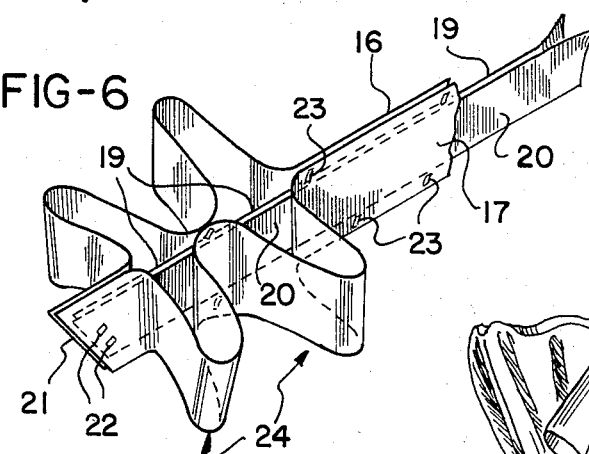
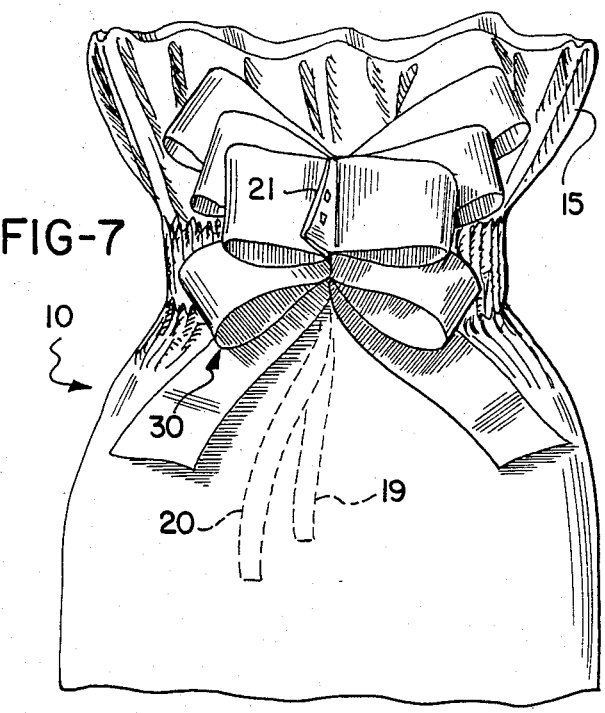

BAG WITH BOW

BACKGROUND OF THE INVENTION

Self-forming ribbon for attachment to packages are already known, as shown in the number of prior patents, including U.S. Pat. No. 4,276,031 issued June 30, 1981 to Lueck and U.S. Pat. No. 4,476,168 issued October 9, 1984 to Aoyama. However, insofar as applicant is aware, such self-forming bows have not been integrated with the packaging material to make a complete gift-receiving package.

This invention relates to decorative packages and more particularly to a novel bag and bow combination which may be used as a complete gift wrap. In spite of the wide variety of gift wrapping materials and packaging materials which are available, a need exists for a ready-to-go package which can be formed without any specific skills or talent into an attractively wrapped package, for receiving gift articles or the like, complete with a decorative ribbon and bow, and ready to be presented as a gift for any occasion, with a minimum of fuss and bother. There also exists a need for such a package which, in the unformed or unerected condition, lies flat for ease of storage, shipment, display, and utilizing a minimum of space.

SUMMARY OF THE INVENTION

The present invention utilizes a self-forming ribbon bow of the type in which an elongated outer pair of bow or petal-forming ribbons are joined together at spaced locations along their respective margins in such a way that the are caused to fold or convolute into a circular array of individual petals or bows when they are slid to one end of a pair of narrow inside ribbons. The outside and inside ribbon pairs normally lie flat against each other. Since the inside ribbons are narrower than the outside ribbons and within the margins of the spaced connections for the outside ribbons, they are free to slide relative to the outside pair. Thus, when the inside ribbons are withdrawn by gripping the inside pair relative to the outside pair, the outside ribbons are caused to form themselves into the individual elements of as bow, as previously described, by folding at the spaced marginal points of attachment. Thereafter, the now exposed inside ribbons may be attached to a package.

In the present invention, the inside ribbon pairs are extending to a length substantially longer than that of the outside pairs and are formed as an integral part of the closure end of a bag-like package, such as a plastic or paper bag. In particular, the inside elongated ribbon pair, at the portion thereof which extends beyond the outside pair, is threaded around the neck of a bag, such as through a continuous passageway or sleeve formed on the bag for that purpose, or through a series of ribbon-receiving apertures or openings formed around the bag. The inside pair is preferably joined together at its remote end to form a single or integral ribbon loop about the neck of the bag. The outer ribbon pair is normally folded flat against the outside surface of the bag and therefore may be packaged or shipped while occupying a minimum of space. The opposite end of the inner ribbon loop is also exposed at an inside surface of the bag for gripping and pulling.

When the loop is thus extracted by pulling at its remote end, that is, at its end remote from the outer pair of ribbons, the bag is drawn closed about its neck, in the nature of a drawstring, and at the same time a decorative bow is formed on one marginal edge or side of the bag to form a complete and attractive ready-to-use gift package.

It is therefore accordingly an important object of this invention to provide a ready-to-form decorative package consisting of a bag and formable bow.

A further object of the invention is the provision of a gift package having a self-forming bow and in which the package is provided with a drawstring or draw ribbon type of closure and in which the bag closure is operated by operating the bow-forming mechanism.

These and other objects and advantages of the invention will be apparent from the following description, the accompanying drawings and the appended claims.

BRIEF DESCRIPTION OF THE DRAWINGS

FIG. 4 is a perspective view of the bow-forming ribbon portion of the invention before joining the inner ends of the inner ribbon;

FIG. 5 is a fragmentary plan view of the bow-forming ribbon of FIG. 4 in the flat form;

FIG. 6 is a perspective view showing the manner in which the bow elements of the outside ribbons form on the inside ribbon during the closure of the bag top;

FIG. 7 is an enlarged elevational view of the top portions of a completed package according to this invention; and FIG. 8 is a plan view of the package and ribbon attached and lying in a flat position against a side surface of the bag for storage, shipment, or the like.

DESCRIPTION OF THE PREFERRED EMBODIMENT

Figure 1:
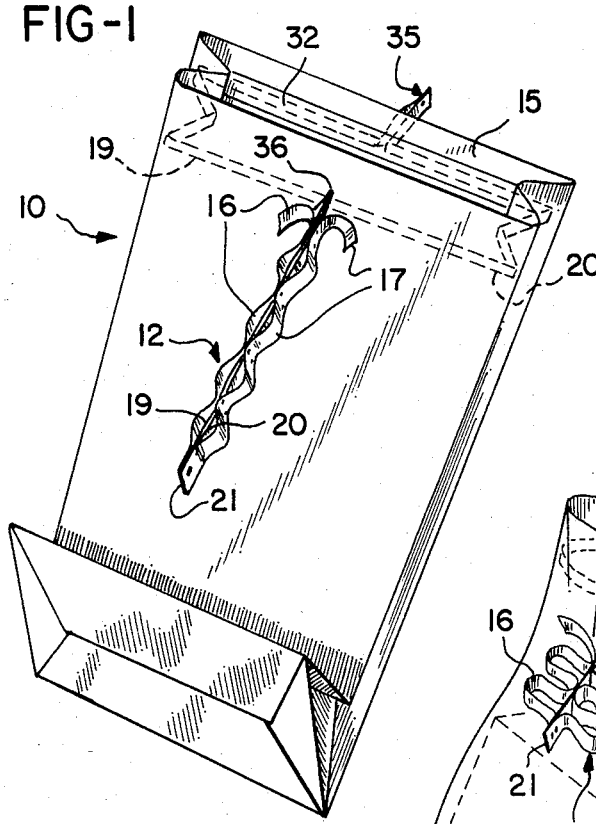
FIG. 1 is a perspective view of the gift package of this invention.

Referring to the figures of the drawings, which represent a preferred embodiment of the invention, a gift package is shown in FIG. 1 as including an open top bag 10 and a bow-forming ribbon member 12. The bag 10 may be of any suitable material, such as decorative paper, plastic or the like, and may have any surface color or decoration applied thereto. An expandable open-top bag 10 is shown which is adapted to receive a gift therein and then drawn closed by gathering about its open top 15.

Figure 2:
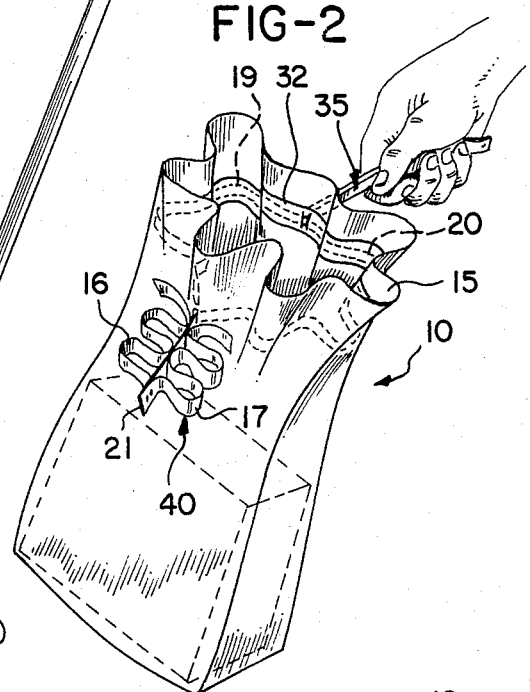
FIG. 2 shows the manner in which the package, with a gift enclosed, may be closed by pulling on the drawstring ribbons and forming the bow.
Figure 3:
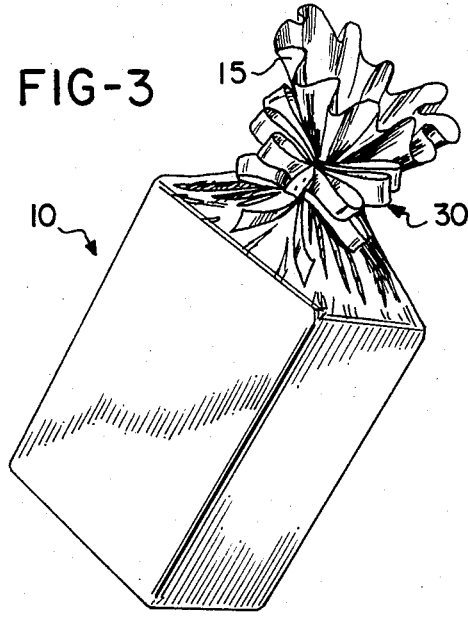
FIG. 3 is a perspective view of a completed gift package.

The bow-forming or self-making ribbon-type bow member 12 is illustrated as having a pair of wider outside bow loop-forming ribbons 16 and 17 (FIGS. 4 and 5) and a pair of elongated inside operating ribbons 19 and 20. As previously mentioned, the outer bow-forming ribbon pairs 16 and 17 are wider than the inside operating ribbon pairs 19 and 20, and normally extend from a common outer end 21 in sliding super-imposed relation to the inside ribbon pair, as illustrated in FIGS. 5 and 6. All four ribbons are stapled or welded together in common at their common end as shown at 22 in FIGS. 5 and 6. Also, the outside pair is stapled or welded together at spaced locations along their marginal edges, such as by welds or pairs of fasteners 23. The fastened locations are at a bias or at an angle to the ribbons, as illustrated in FIG. 5, so that when the outer pair of bow-forming ribbons are caused to slide with respect to the inside pair of ribbons, the individual or convolutions 24 bow elements are formed, as illustrated in FIGS. 2, 3 and 7, which elements tend to be rotated about their axis to form an attractive completed bow 30.

As previously noted, the inside operator ribbon pairs 19 and 20 are substantially longer than the bow-forming outer pairs 16 and 17, as illustrated in FIG. 4, and the extended portion thereof beyond the outer ribbon pair is permanently applied to the closure top 15 of the bag 10. This may be done by threading the ribbons 19 and 20 through a series of circumferentially spaced slots in the bag top or, as shown in FIG. 2, by threading the same through a continuous inside sleeve member 32 which has been attached to or formed on an inside circumference of the bag, somewhat inwardly of the opening at the top. The remote terminal ends of the bow members 19 and 20 are preferably joined together as shown at 35 in FIG. 1 to form a closed loop. The ends are shown as separated in FIG. 4 prior to joining. While the ribbon-forming bow member 12 may be manufactured in this manner, it is preferred to close these ends or tie them together as at 35 to form a continuous closed loop in the ribbon-receiving sleeve 32. A forward portion of the wall of the bag is apertured at a forward slot 36 through which the inside ribbons extend outwardly in common with the bow-forming ribbon sections. The back wall is further apertured so that the connected ends 35 form a loop or finger-gripping tab exteriorly of the bag, so that this tab end 35 may be conveniently hand-gripped and drawn away from the bag. The slots in the bag are only wide enough to receive the narrow inside ribbons 19 and 20 therethrough.

Figure 8:
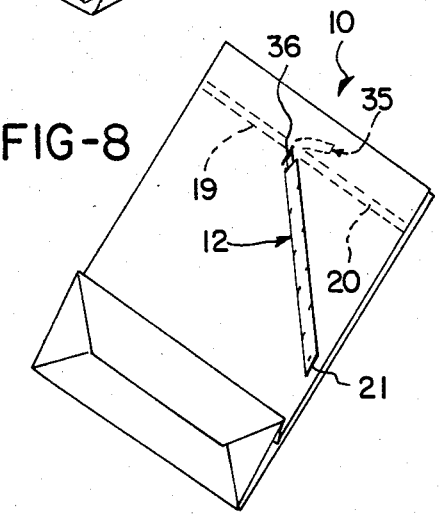

When end 35 is pulled, the top 15 of the bag is closed like a drawstring and gathered on the inside ribbons 19 and 20. Simultaneously, the decorative bow 30 is formed by the gathering of the convolutions 24 of the outer bow-forming members 16 and 17 so that in a single operation, the completed decorative bow is formed, and the bag is gathered about its top 15 and closed thereabout, as shown in FIGS. 3 and 7. However, prior to this operation, it is contemplated that the exterior portions of the ribbon will lie flat against the adjacent outside surface of the bag 10, as shown in FIG. 8. In this manner, the gift package combination of this invention may be packaged for distribution and sale to occupy a minimum of space during such storage, shipment or transit, and during display.

The operation of the invention is largely self-evident from the foregoing description and the drawings. A purchaser desiring a ready-to-make gift package may simply insert his gift within the bag 10 and by pulling the gripping or connected portion 35 of the loop formed by the inner ribbons 19 and 20. Top 15 of the bag will be gathered thereabout and simultaneously a decorative bow is gathered and formed at the now formed neck of the bag, thus completing the package. If desired, the extracted external portions of the inside ribbons may be tied back around the bag neck or may be clipped off, as desired. The gift package is in fact reusable. When it is opened, the bow 30 can be brought out straight by pulling at the common ribbon end 21, and the neck of the bag opened on the inside ribbons, for removal of the contents and for subsequent use.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a gift package, the improvement comprising:
a bag with an open top,
means in said bag forming part of said top and defining draw string receiving portions which are proportioned to receive a ribbon therethrough in surrounding relation to said top,
a self-making ribbon type bow member having a pair of outside bow loop-forming ribbons and means defining an elongated inside operating ribbon member which may be pulled with respect to said outside ribbons to form a decorative bow by said outside ribbons, said inside ribbon member being threaded through said drawstring receiving portions of said bag and forming with respect to said bag a loop encircling said bag top with said outside ribbons positioned adjacent one side of said bag, said inside ribbon member having means defining a finger-gripping portion extending exteriorly of said bag on a side thereof remote from said outside ribbons, whereby pulling on said inside ribbon member at said finger-gripping portion causes said bag top to be closed by gathering action on said inside ribbon member and causes said outside ribbons to form a decorative bow closely adjacent an outer surface of said bag.

2. A gift packaging comprising in combination:
a bag with an open top to receive a gift therein,
sleeve means forming part of said top and formed in surrounding relation to said top, defining a drawstring passage which is proportioned to receive an operating ribbon therethrough,
a first slit in said bag opening into said passage and having a width to accommodate said operating ribbon,
a second slit in said bag opening into said passage on a side of said bag, generally opposite of said first slit,
a self-making ribbon type bow member having a pair of outside bow loop-forming ribbons and an elongated inside operating ribbon which may be pulled with respect to said outside ribbons to form a decorative bow by said outside ribbons, said inside ribbon being threaded through said first slit and into said passage and forming with respect to said bag a loop encircling said bag top with said outside ribbons positioned adjacent one side of said bag, said inside ribbon having means defining a finger-gripping portion extending exteriorly of said bag through said second slit whereby pulling on said inside ribbon at said finger-gripping portion causes said bag top to be closed by gathering action on said inside ribbon and causes said outside ribbons to form a decorative bow closely adjacent an outer surface of said bag.

3. In a gift package, the improvement comprising:
a bag with an open top,
means on said bag defining draw string receiving portions which are proportioned to receive a ribbon therethrough in surrounding relation to said top,
a self-making ribbon type bow member having a pair of outside bow loop-forming ribbons and a pair of elongated inside operating ribbons narrower than said outside ribbons which may be pulled with respect to said outside ribbons to form a decorative bow by said outside ribbons, said inside ribbons being threaded through said drawstring receiving portions of said bag and forming a loop encircling said bag top with said outside ribbons positioned adjacent one side of said bag, said inside ribbons having a finger-gripping portion thereof positioned exteriorly of said bag on a side thereof remote from said outside ribbons, whereby pulling on said inside ribbons at said finger-gripping portion causes said bag top to be closed by gathering action on said inside ribbons and causes said outside ribbons to form a decorative bow closely adjacent an outer surface of said bag, said outside ribbons normally positioned to lie flat against an adjacent surface of said bag for storage and shipment of said package.

* * * * *